United States Patent [19]
Watanabe

[11] Patent Number: 5,355,771
[45] Date of Patent: Oct. 18, 1994

[54] VALVE MECHANISM FOR BRAKE BOOSTER

[75] Inventor: Makoto Watanabe, Saitama, Japan
[73] Assignee: Jidosha Kiki Co., Ltd., Tokyo, Japan
[21] Appl. No.: 98,199
[22] Filed: Jul. 28, 1993
[30] Foreign Application Priority Data
  Aug. 28, 1992 [JP] Japan .................. 4-066339[U]
[51] Int. Cl.⁵ .................................... F15B 9/10
[52] U.S. Cl. .................... 91/376 R; 92/98 R; 92/48
[58] Field of Search ........... 91/369.2, 369.3, 376 R; 92/98 R, 99, 101, 48; 60/547.1

[56] References Cited
U.S. PATENT DOCUMENTS

| | | | |
|---|---|---|---|
| 3,754,450 | 8/1973 | Putt et al. | 91/376 R X |
| 4,587,884 | 5/1986 | Tsubouchi | 91/376 R X |
| 4,633,760 | 1/1987 | Wagner | 91/369.2 X |
| 4,970,939 | 11/1990 | Fecher et al. | 91/376 R X |
| 5,027,695 | 7/1991 | Inoue et al. | 91/376 R X |
| 5,046,398 | 9/1991 | Hamamiya et al. | 91/369.2 |
| 5,062,348 | 11/1991 | Gotoh et al. | 91/369.2 |
| 5,083,495 | 1/1992 | Satoh | 91/369.2 |
| 5,083,496 | 1/1992 | Suzuki et al. | 91/376 |
| 5,121,673 | 6/1992 | Araki | 91/369.1 |

*Primary Examiner*—Edward K. Look
*Assistant Examiner*—Hoang Nguyen
*Attorney, Agent, or Firm*—Flynn, Thiel, Boutell & Tanis

[57] ABSTRACT

A valve mechanism for brake booster, in particular, of a brake booster which is provided with a mechanism for reducing a lost stroke, includes a first valve seat on which a plurality of tabs are formed, with communication areas being defined by spaces left between adjacent tabs. When the brake booster is inoperative, if the first valve seat moves close to the valve element such that the latter may be seated upon the first valve seat, the tabs abut against the valve element to assure a reliable communication between the inside and the outside of the first valve seat by means of the communication areas. When the booster is inoperative, the tabs are embedded in the valve element to block or interrupt the communication through the first valve seat. In the conventional practice, the design has been to minimize the lost stroke to the extent that the valve element cannot be seated upon the first valve seat when the booster is inoperative. But, according to the invention, if the valve element gently contacts the first valve seat, the communication area reliably maintains the communication through the first valve seat, thus allowing the lost stroke to be reduced in comparison to the prior art arrangement.

4 Claims, 5 Drawing Sheets

VALVE MECHANISM FOR BRAKE BOOSTER

FIELD OF THE INVENTION

The invention relates to a valve mechanism for brake booster, and more particularly, to a valve mechanism for brake booster which is provided with a mechanism for reducing a lost stroke.

DESCRIPTION OF THE PRIOR ART

A valve mechanism for brake booster is known in the art comprising a first valve seat formed on a valve body which is slidably disposed within a shell, a valve plunger slidably fitted within the valve body, a second valve seat formed on the valve plunger, a valve element formed by a resilient member and adapted to be driven into contact or away from the first and the second valve seat for selectively switching a fluid circuit and a key member mounted on the valve body so as to be reciprocable in the axial direction thereof and held in abutment against the inner wall surface of the shell to maintain the valve plunger at an advanced position relative to the valve body when the brake booster is inoperative.

When a brake booster of negative pressure type which is provided with the described valve mechanism is inoperative, the valve element is seated upon the second valve seat formed on the valve plunger to close a passage which provides a communication between a variable pressure chamber defined within the shell and the atmosphere to block the flow of the atmosphere into the variable pressure chamber while the valve element is removed from the first valve seat formed on the valve body, whereby the variable pressure chamber communicates with a constant pressure chamber in which a negative pressure is normally maintained.

If a brake pedal is now depressed to drive an input shaft, and hence the valve plunger which is connected thereto forward in an integral manner, the valve element is integrally driven forward while it remains seated upon the second valve seat formed on the valve plunger, and ultimately the valve element becomes seated upon the first valve seat formed on the valve body to interrupt the communication between the variable and the constant pressure chamber. If the input shaft and the valve plunger continue to be driven forward, the valve element which is seated upon the first valve seat formed on the valve body and hence is prevented from moving forward then moves away from the second valve seat formed on the valve plunger, whereby the atmosphere is allowed to flow into the variable pressure chamber through a clearance between the valve element and the second valve seat.

As a consequence, a pressure differential is created between the constant pressure chamber and the variable pressure chamber, which are disposed across a power piston that is integrally mounted on the valve body, due to the negative pressure and the atmospheric pressure, whereby the power piston and the valve body are driven forward under the influence of the pressure differential, thus bringing forth a push rod together with the valve body to actuate a brake.

When the force with which the brake pedal is depressed is maintained constant, the valve body will move forward relative to the valve plunger, and eventually the valve element which is seated upon the first valve seat formed on the valve body becomes seated upon the second valve seat which is formed on the valve plunger, thus interrupting the flow of the atmosphere into the variable pressure chamber to achieve a servo balance condition.

If the brake pedal is then released, the input shaft and the valve plunger move back, and the valve element which is seated upon the second valve seat formed on the valve plunger moves rearward in an integral manner to be removed from the first valve seat. This allows a communication between the variable and the constant pressure chamber to be established, whereby the atmosphere in the variable pressure chamber finds its way into the constant pressure chamber to reduce the pressure differential across the power piston, which is therefore retracted under the influence of a return spring.

The retracting movement of the valve plunger relative to the valve body is constrained by a key member, which is mounted on the valve body so as to be reciprocable in the axial direction thereof, so that at the retracted position thereof, the valve element which is seated upon the second valve seat formed on the valve plunger will be largely spaced from the first valve seat formed on the valve body, thus securing a sufficient flow channel area between the variable and the constant pressure chamber.

As the valve body continues to retract, a point is reached where the key member abuts against the internal wall surface of the shell, which stops its retracting movement, whereupon the valve plunger which is mechanically coupled to the key member is also constrained from retracting. On the other hand, since the key member is reciprocably mounted on the valve body, the valve body is allowed to continue its retracting movement until it abuts against the key member which has stopped its movement by abutment against the internal wall surface of the shell, and thus stops its retracting movement.

Under this condition, the valve plunger is mechanically coupled to the key member and is advanced relative to the valve body, so that the valve element which is seated upon the second valve seat formed on the valve plunger also assumes an advanced position relative to the valve body, located close to the first valve seat formed on the valve body.

Accordingly, when the brake pedal is depressed for the next time, the valve element will be immediately seated upon the first valve seat, thus reducing the lost stroke which the valve element experiences until it becomes seated upon the first valve seat.

It will be appreciated from the foregoing description that in order to reduce the lost stroke, it is only necessary that the valve element be disposed as close to the first valve seat as possible in the inoperative condition of the brake booster. However, when an arrangement is made to provide a minimal clearance between the first valve seat and the valve element, there occurs a likelihood that the valve element which is seated upon the second valve seat formed on the valve plunger may also be seated upon the first valve seat.

In the event such occurrence is true, as the negative pressure is introduced into the constant pressure chamber under the condition that the atmosphere is introduced into both the constant and the variable pressure chamber, the seating of the valve element upon the first valve seat prevents the negative pressure from being introduced into the variable pressure chamber, whereby the negative pressure introduced into the constant pressure chamber and the atmospheric pressure within the variable pressure chamber cause the power piston and the valve body to be driven forward without depressing the brake pedal. Under the condition that the brake pedal is not depressed, a slight forward movement of the valve body immediately results in a servo balance condition, but a slight forward movement of the power piston and the valve body may cause a slightly braked condition without the depression of the brake pedal, thus resulting in a risk of dragging the brake.

Accordingly, there has been a need in the prior art to provide some means which reliably prevents the valve element from being seated upon the first valve seat if an attempt is made to reduce the lost stroke, and this resulted in a certain limit imposed upon reducing the lost stroke.

SUMMARY OF THE INVENTION

In view of the foregoing, it is an object of the invention to provide a valve mechanism for brake booster which enables the lost stroke to be reduced as compared with the prior art.

Thus, in a conventional valve mechanism for brake booster as mentioned above, in accordance with the invention, at least one of seat regions of the first valve seat and the valve element which become engaged as the valve element is seated upon the first valve seat is formed with an abutment which abuts against part of the oppositely located seat region, and a communication area at a location adjacent to the abutment, so that when the abutment abuts against the oppositely located seat region with a force less than a given value, the communication area is effective to provide a communication between the inside and the outside of the both seat regions while when the abutment abuts against the oppositely located seat region with a force equal to or greater than the given value, the valve element closes the communication area by its elastic deformation to interrupt the communication between the inside and the outside of the both seat regions.

With this arrangement, in the inoperative condition of the brake booster, if the valve element lightly contacts the first valve seat, the abutment abuts against part of the oppositely located seat region, and the communication area is able to establish a communication between the inside and the outside of the both seat regions. Accordingly, a communication between the variable and the constant pressure chamber can be reliably established when the brake booster is inoperative.

When a force equal to or greater than the given value is applied to the valve element as a result of the depression of the brake pedal, the valve element will be elastically deformed to close the communication area. This interrupts the communication between the inside and the outside of the both seat regions, thus interrupting the communication between the variable and the constant pressure chamber to allow a normal brake booster action.

Consequently, as compared with a prior art arrangement in which the valve element must be spaced from the first valve seat, the magnitude of the lost stroke can be reduced.

Above and other objects, features and advantages of the invention will become apparent from the following description of several embodiments thereof with reference to the attached drawings.

DETAILED DESCRIPTION OF EMBODIMENTS

Figure 1:
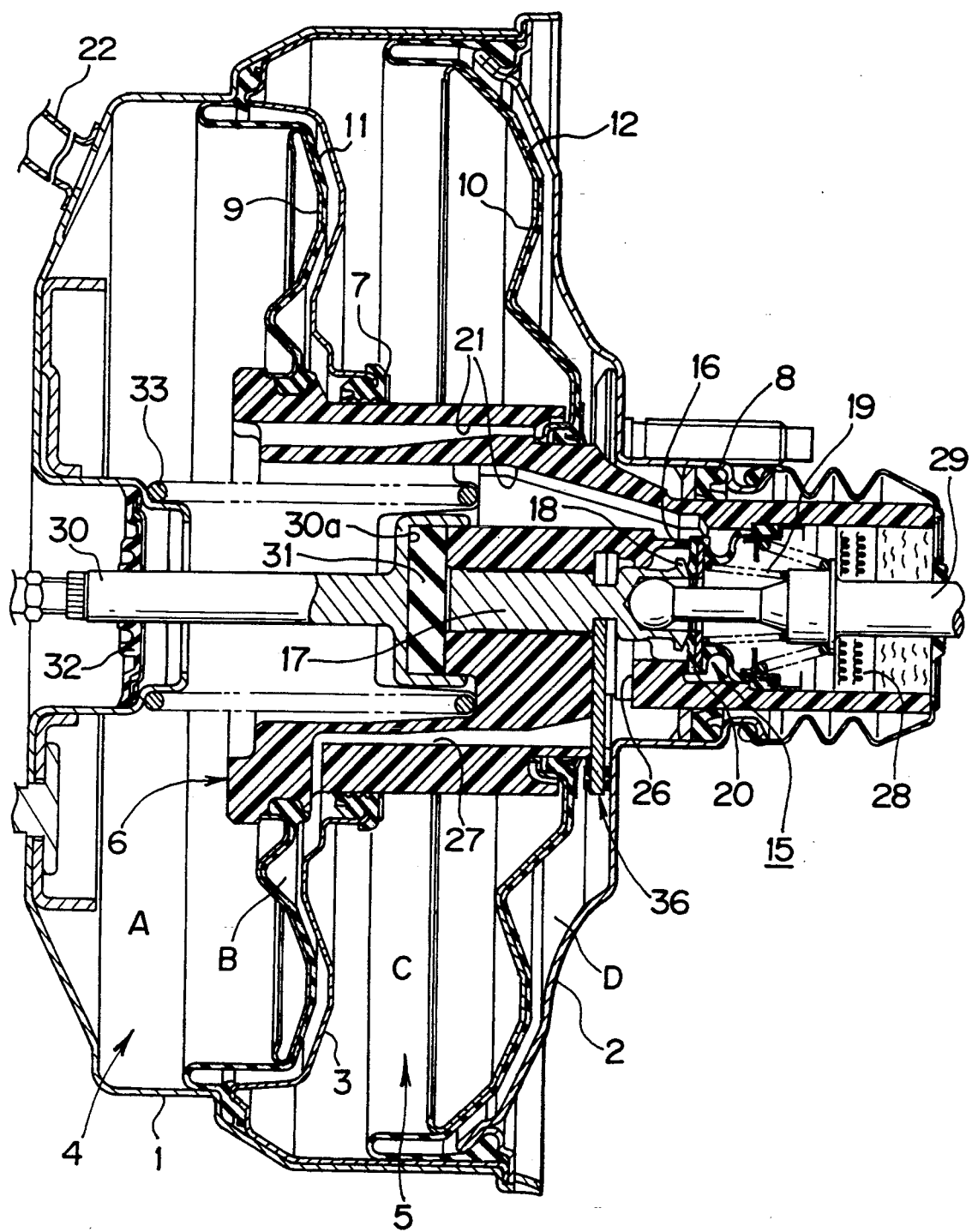
FIG. 1 is a cross section of one embodiment of the invention.
Figure 2:
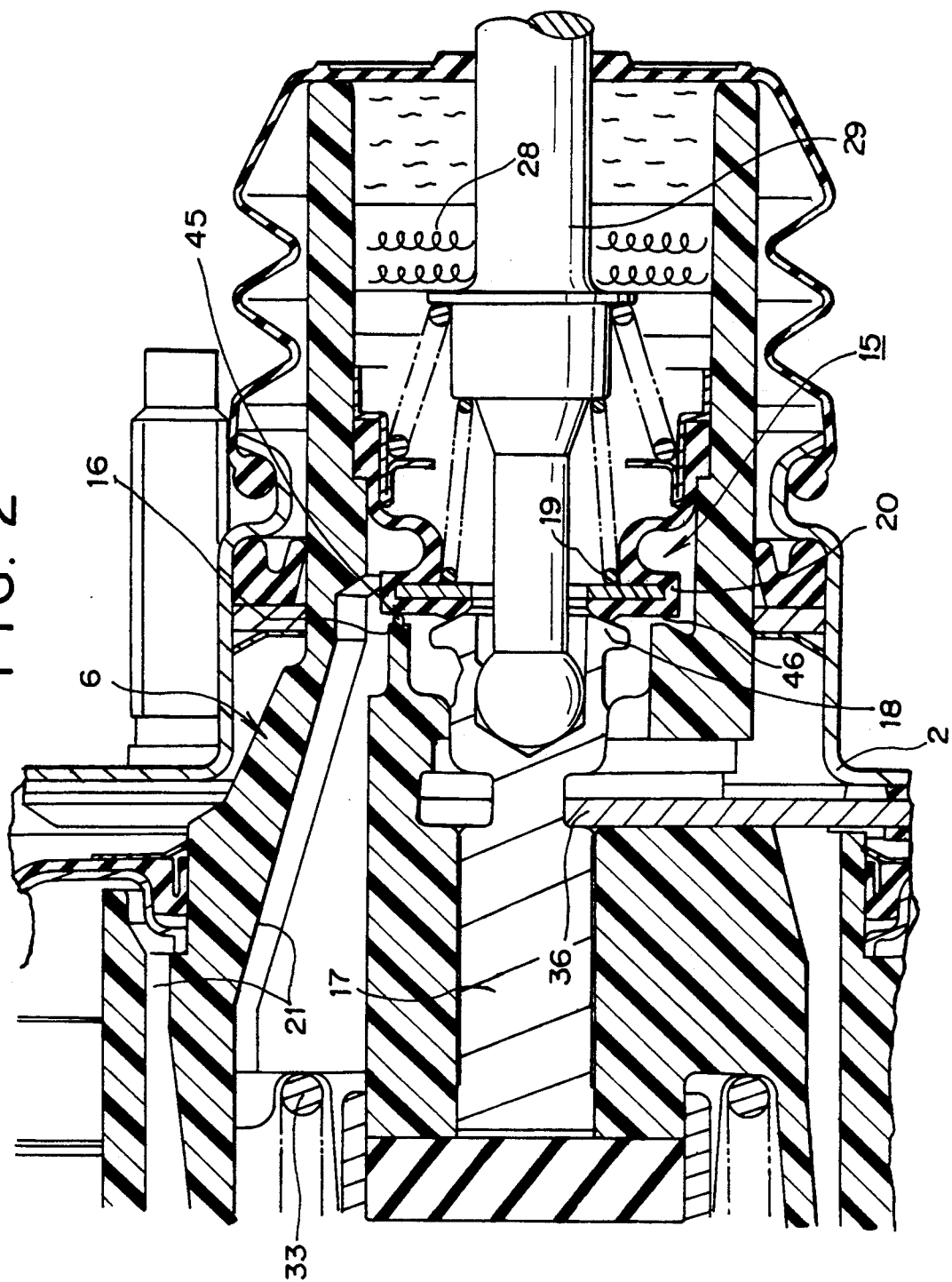
FIG. 2 is an enlarged view of an essential part shown in FIG. 1.
Figure 3:
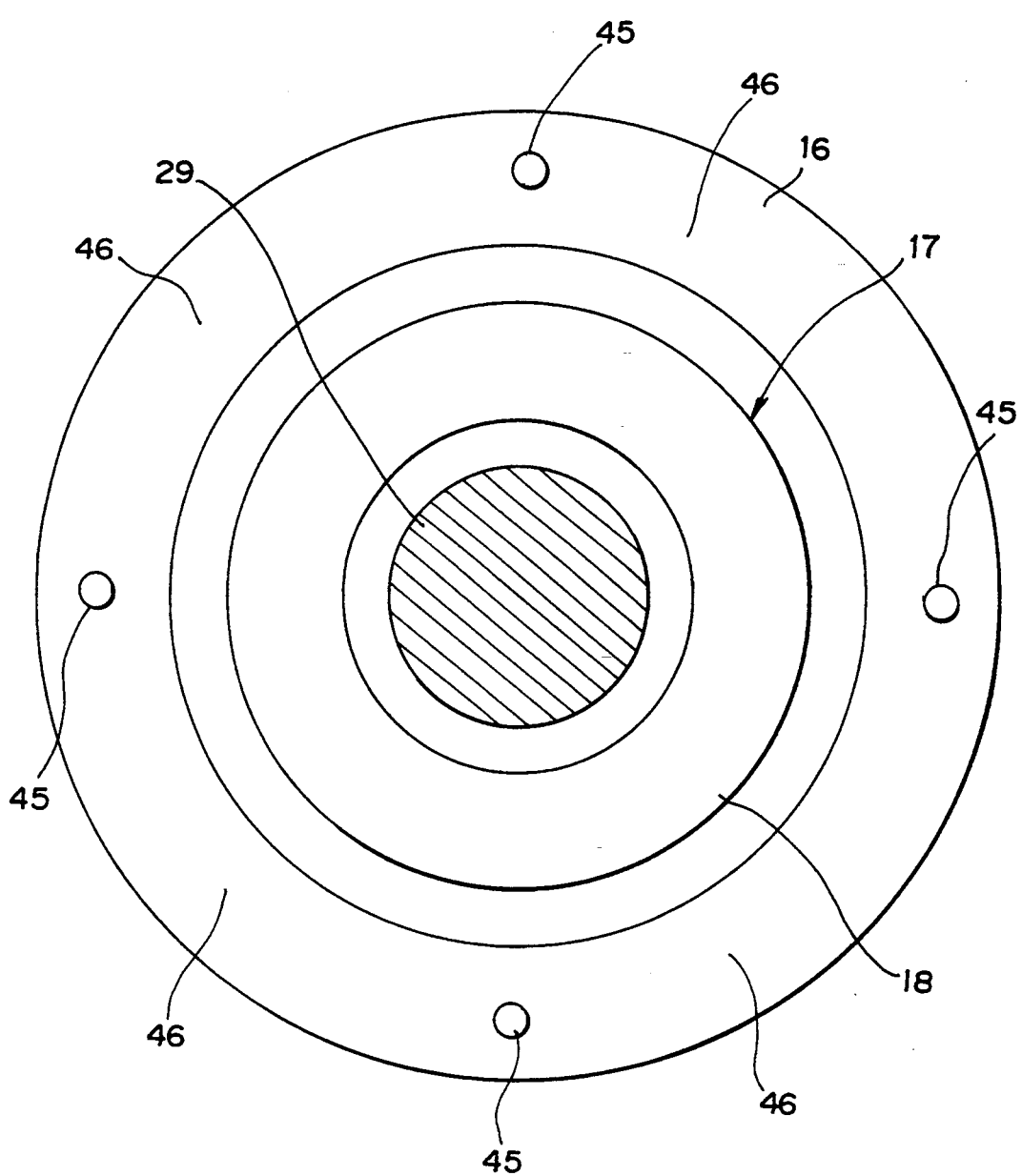
FIG. 3 is a right-hand side elevation of a region including a first valve seat 16.

Referring to the drawings, several embodiments of the invention will now be described. Initially referring to FIG. 1, a front shell 1 and a rear shell 2 define an enclosed vessel, and a center plate 3 which is disposed centrally therein divides the interior into a front chamber 4 and a rear chamber 5 which are disposed forwardly and rearwardly thereof. A substantially tubular valve body 6 slidably extends through the axial portions of the rear shell 2 and the center plate 3 with annular seal members 7, 8 interposed therebetween to maintain a hermetic seal.

A front power piston 9 and a rear power piston 10, which are disposed in the front chamber 4 and the rear chamber 5, respectively, are connected to the valve body 6, and a front diaphragm 11 and a rear diaphragm 12 are applied to the back surfaces of the power pistons 9 and 10, respectively, thus defining a constant pressure chamber A and a variable pressure chamber B across the front diaphragm 11 and also a constant pressure chamber C and a variable pressure chamber D across the rear diaphragm 12.

A valve mechanism 15 which switches a fluid circuit between the pair of constant pressure chambers A, C and the pair of variable pressure chambers B, D is disposed within the valve body 6 and comprises an annular first valve seat 16 formed on the valve body 6, an annular second valve seat 18 formed, radially inward of the first valve seat 16, on the right end of a valve plunger 17 which is slidably disposed within the valve body 6, and a valve element 20, formed by a resilient member, which is urged by a spring 19 from the right side, as viewed in FIG. 1, to be seated upon either valve seat 16 or 18.

A space radially outward of the annular seat regions where the first valve seat 16 and the valve element engage each other communicates with the constant pressure chambers A, C through a constant pressure passage 21 formed in the valve body 6, and the constant pressure chamber A communicates with an intake manifold, not shown, through a tubing 22 mounted on the front shell 1 which is used to introduce a negative pressure.

A space radially inward of the annular seat regions where the first valve seat 16 and the valve element 20 engage each other, but radially outward of another annular seat regions where the second valve seat 18 and the valve element 20 engage each other, namely, a space located intermediate the inner and the outer annular seat regions communicates with the variable pressure chamber D through a radial variable pressure passage 26 which is formed in the valve body 6, and the variable pressure chamber D in turn communicates with the variable pressure chamber B through another variable pressure passage 27 which is also formed in the valve body 6.

A space radially inward of the inner annular seat where the second valve seat 18 and the valve element 20 engage each other communicates with the atmosphere through a filter 28.

The valve plunger 17, which is slidably disposed within the valve body 6, has its right end connected to an input shaft 29 which is mechanically coupled to a brake pedal, not shown, while the left end thereof is disposed in opposing relationship with the right end face of a reaction disc 31 which is received in a recess 30a formed in one end of a push rod 30. The left end of the push rod 30 slidably extends through the axial portion of the front shell 1, or more specifically, through a seal member 32 to the outside of the shell for connection with a piston of a master cylinder, not shown. The valve body 6 is normally maintained in its inoperative position shown by a return spring 33.

A key member 36 which prevents the valve plunger 17 from being withdrawn from the valve body 6 is axially movable through a given stroke relative to each of the valve body 6 and the valve plunger 17, and in the inoperative condition of the brake booster, abuts against the internal wall surface of the rear shell 2. Under this condition, the key member 36 advances the valve plunger 17 relative to the valve body 6 to cause the valve element 20 to be located close to the first valve seat 16 so that if the brake pedal is now depressed to actuate the input shaft 29 and the valve plunger 17, the valve mechanism 15 immediately operates to perform a switching of the fluid circuit.

In the present embodiment, the first valve seat 16 is formed on its surface which is engaged by the valve element with tabs 45 which extend toward the valve element 20 at four locations circumferentially spaced apart thereof. Communication areas 46 are formed by spaces defined between circumferentially adjacent ones of the four tabs 45.

In the inoperative condition of the brake booster, when the valve element 20 and the first valve seat 16 move close to each other so that their engaging surfaces or seat regions contact each other, the tabs 45 abut against the engaging surface of the valve element 20. Under this condition, the tabs 45 engage the surface of the valve element 20 with a reduced force, and accordingly the communication areas 46 are effective to provide a communication between the inside and the outside of the both engaging surfaces, whereby the both constant pressure chambers A, C and the variable pressure chambers B, D communicate with each other in a reliable manner.

By contrast, when the brake pedal is depressed to actuate the booster, the tabs 45 will be pressed against the valve element 20 with a greater force which exceeds the given value, and accordingly the valve element 20 is deformed elastically to cause the tabs 45 to be embedded into the valve element 20. This causes the both engaging surfaces or seat regions of the valve element 20 and the first valve seat 16 to contact each other entirely, whereby the communication areas 46 are closed, thus interrupting the communication between the inside and the outside of the both surfaces. At this time, the communication between the both constant pressure chambers A, C and the variable pressure chambers B, D is interrupted.

In the described arrangement, when the brake pedal, not shown, is depressed to drive the input shaft 29 and the valve plunger 17 to the left, the valve element 20 initially abuts against the tabs 45 on the first valve seat 16. Subsequently, as the input shaft 29 and the valve plunger 17 continue to be driven to the left, the tabs 45 will be embedded into the valve element 20 to close the communication areas 46, whereby the engaging surfaces of the valve element 20 and the first valve seat 16 contact each other, interrupting the communication between the constant pressure chambers A, C and the variable pressure chambers B, D.

As the input shaft 29 and the valve plunger 17 are driven further to the left, the second valve seat 18 on the valve plunger 17 moves away from the valve element 20 to allow the atmosphere to communicate with the variable pressure chambers B, D, thus introducing the atmosphere into the variable pressure chambers B, D. Accordingly, a pressure differential across each of the power pistons 9, 10 is effective to drive the power pistons 9, 10 and the valve body 6 forward against the resilience of the return spring 33 to provide a braking action, in the similar manner as occurs in a conventional brake booster of tandem type.

If the brake pedal is released under the braked condition, the second valve seat 18 on the valve plunger 17 will be seated upon the valve element 20 to interrupt the communication between the atmosphere and the variable pressure chambers B, D while the valve element 20 will be removed from the first valve seat 16 to cause the variable pressure chambers B, D to communicate with the constant pressure chambers A, C, whereby the power pistons 9, 10 will be returned to their original inoperative positions under the influence of the return spring 33.

When the key member 36 abuts against the internal surface of the rear shell 2 as a result of the retracting movement of the power pistons 9, 10, this stops the retracting movement of the valve plunger 17 which is coupled with the key member, while the power pistons 9, 10 and the valve body 6 continue to retract until the retracting movement of the valve body 6 brings the first valve seat 16 on the valve body 6 close to the valve element 20 to substantially eliminate the clearance therebetween, whereupon the valve body 6 abuts against the key member 36 to stop its movement. Accordingly, when the input shaft 29 is driven forward for the next time, the valve mechanism 15 is immediately operative to switch the fluid circuit.

In the inoperative condition of the brake booster, when the first valve seat 16 and the valve element 20 move close enough to each other that their opposing engaging surfaces or seat regions contact gently, the tabs 45 on the first valve seat 16 abut against the opposing surface of the valve element 20, thus maintaining the opposing surfaces of the valve element 20 and the first valve seat 16 to be spaced from other each. In this manner, a communication between the constant pressure chambers A, C and the variable pressure chambers B, D can be maintained through the communication areas 46.

If then the communication between the constant pressure chambers A, C and the variable pressure chambers B, D fails to be maintained and if the atmosphere has been introduced into the constant pressure chambers A, C and the variable pressure chambers B, D during the assembly of the brake booster or as a result of its being left inoperative for a prolonged period of time, the negative pressure cannot be introduced into the variable pressure chambers B, D as the negative pressure is introduced into the constant pressure chambers A, C, producing a pressure differential across the power pistons 9, 10. This presents a likelihood that the power pistons 9, 10 and the valve body 6 may be driven forward to cause a dragging of the brake without depression of the brake pedal.

However, when the provision of the tabs 45 and the communication areas 46 is effective to maintain the communication between the constant pressure chambers A, C and the variable pressure chambers B, D in the inoperative condition of the brake booster as in the present embodiment, if the negative pressure is introduced into the constant pressure chambers A, C under the condition that the atmosphere has been introduced into the constant pressure chambers A, C and the variable pressure chambers B, D, such negative pressure can also be introduced into the variable pressure chambers B, D, preventing a pressure differential from being developed across the power pistons 9, 10.

Accordingly, if the valve element 20 and the first valve seat 16 are disposed as close to each other as possible in the inoperative condition of the brake booster, the likelihood of causing a dragging of the brake is eliminated. This enables a lost stroke to be minimized upon depressing the brake pedal to actuate the brake booster.

Second Embodiment

Figure 4:
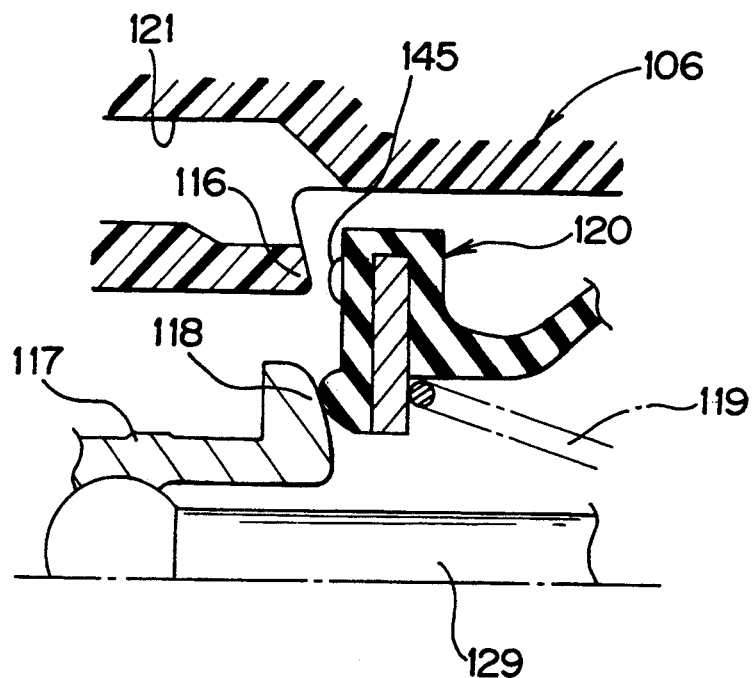
FIG. 4 is a cross section of a second embodiment of the invention.
Figure 5:
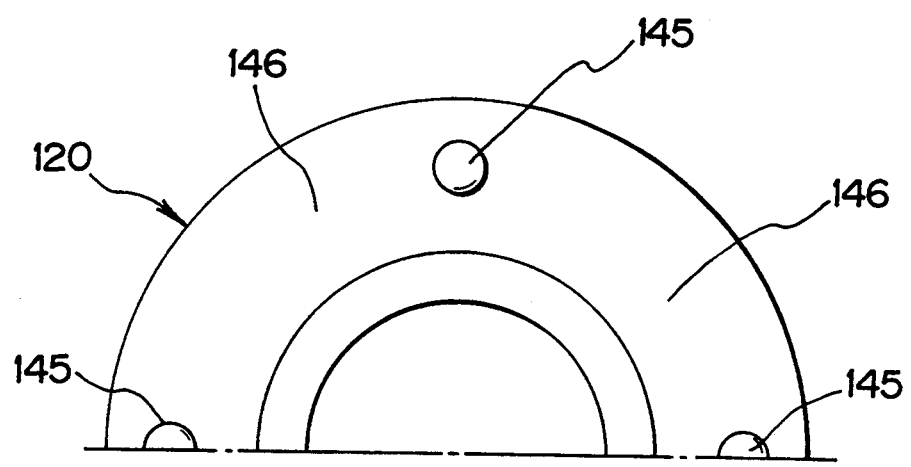
FIG. 5 is a left-hand side elevation of a part shown in FIG. 4.

FIGS. 4 and 5 illustrate a second embodiment of the invention. In the first embodiment, the tabs 45 are provided on the engaging surface of the first valve seat 16 so as to extend toward the valve element 20. By contrast, in the second embodiment, tabs 145 are formed on the engaging surface of a valve element 120 which is adapted to move toward or away from a first valve seat 116 so as to extend toward the first valve seat 116. Communication areas 146 are defined by spaces between adjacent tabs 145.

The second embodiment achieves the similar function and effect as those achieved by the first embodiment. It is to be noted that parts shown in FIGS. 4 and 5 are designated by corresponding numerals as used in the description of the first embodiment, to which 100 is added.

Third Embodiment

Figure 6:
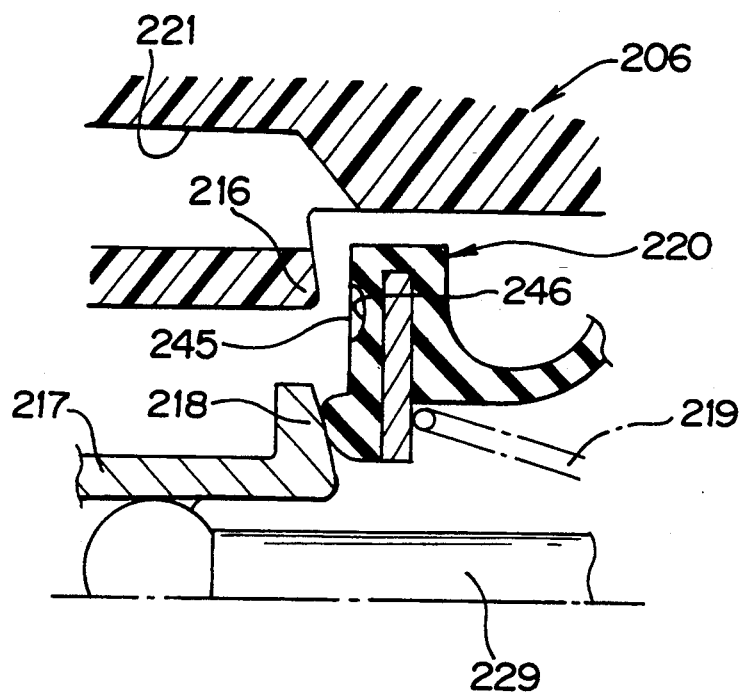
FIG. 6 is a cross section of a third embodiment of the invention.
Figure 7:
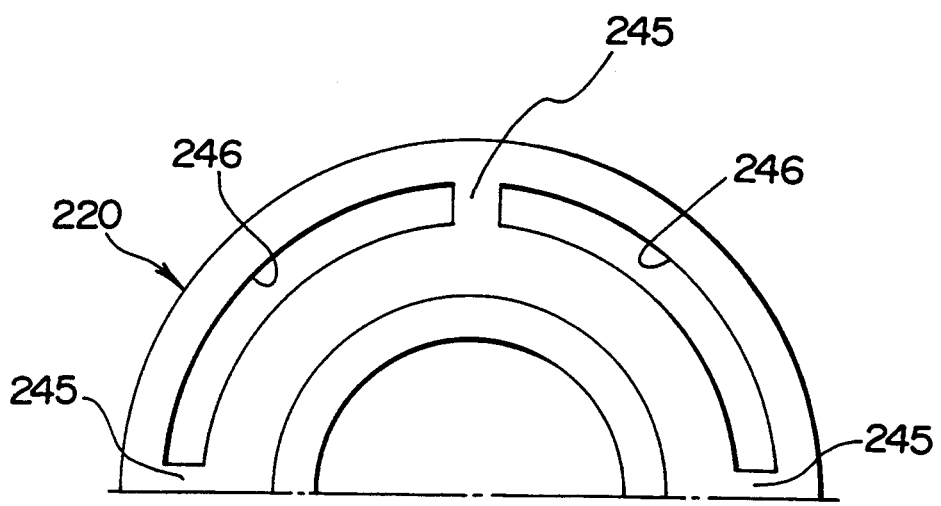
FIG. 7 is a left-hand side elevation of part shown in FIG. 6.

FIGS. 6 and 7 illustrate a third embodiment of the invention in which the tabs 45, 145 shown in the first two embodiments are replaced by recesses formed in the engaging surface of a flat first valve seat 216. Specifically, four arcuate grooves are formed in the engaging surface of a valve element 220 which is disposed opposite to the inner peripheral edge of the engaging surface of the first valve seat 216, and the internal spaces of the arcuate grooves define communication areas 246, while boundaries which define adjacent arcuate grooves form abutments 245 which are equivalent to the tabs 45, 145 in function.

The third embodiment again achieves the similar function and effect as those achieved by the first two embodiments. It is to be noted that parts of the third embodiment are designated by similar reference numerals as those used to designate parts of the first embodiment, to which 200 is added.

While the invention has been described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A valve mechanism for brake booster including a first valve seat formed on a valve body which is slidably disposed within a shell, a valve plunger slidably fitted within the valve body, a second valve seat formed on the valve plunger, a valve element formed by a resilient member for movement toward and away from the first and the second valve seat for selectively switching a fluid circuit, and a key member mounted on the valve body and reciprocable in an axial direction thereof and abutting against an internal wall surface of the shell to maintain the valve plunger at an advanced position relative to the valve body when the brake booster is inoperative; the valve mechanism comprising an abutment formed on at least one of engaging surfaces of the first valve seat of said valve body and the valve element where they are engaged when the valve element is seated upon the first valve seat so as to abut against part of the opposing engaging surface, and a communication area formed adjacent to the abutment, said communication area providing communication through the engaging surfaces of said valve body and said valve element when the abutment abuts against the opposing engaging surface with a force less than a given value while when the abutment abuts against the opposing engaging surface with a force greater than the given value, an elastic deformation of the valve element causes the communication area to be closed to interrupt the communication through the engaging surfaces of said valve body and said valve element.

2. A valve mechanism according to claim 1 in which the abutment comprises a plurality of tabs formed on the engaging surface of the first valve seat, and the communication area comprises spaces defined between adjacent ones of the plurality of tabs.

3. A valve mechanism according to claim 1 in which the abutment comprises a plurality of tabs formed on the engaging surface of the valve element, and the communication area comprises spaces defined between adjacent ones of the plurality of tabs.

4. A valve mechanism according to claim 1 in which the communication area comprises a plurality of arcuate grooves formed in the engaging surface of the valve element, and the abutment comprises boundaries defined between adjacent arcuate grooves, said boundaries engaging the engaging surface of the first valve seat of said valve body.

* * * * *